(12) United States Patent
Meir et al.

(10) Patent No.: US 7,570,846 B2
(45) Date of Patent: Aug. 4, 2009

(54) HIGH EFFICACY WAVEGUIDE COUPLER

(75) Inventors: Noam Meir, Herzlia (IL); Eran Fine, Tel-Aviv (IL)

(73) Assignee: Oree, Advanced Illumination Solutions Inc., Ramat-Gan (IL)

(*) Notice: Subject to any disclaimer, the term of this patent is extended or adjusted under 35 U.S.C. 154(b) by 217 days.

(21) Appl. No.: 11/157,190

(22) Filed: Jun. 21, 2005

(65) Prior Publication Data
US 2006/0008205 A1  Jan. 12, 2006

Related U.S. Application Data

(60) Provisional application No. 60/580,705, filed on Jun. 21, 2004.

(51) Int. Cl.
*G02B 6/26* (2006.01)
(52) U.S. Cl. .................. 385/15; 385/39; 385/50
(58) Field of Classification Search .......... 385/15, 385/50, 39
See application file for complete search history.

(56) References Cited

U.S. PATENT DOCUMENTS

| | | | |
|---|---|---|---|
| 4,762,381 A | 8/1988 | Uemiya et al. | |
| 4,829,192 A | 5/1989 | Kokubu | |
| 5,165,187 A * | 11/1992 | Shahidi-Hamedani et al. | 40/547 |
| 6,079,838 A | 6/2000 | Parker et al. | |
| 6,275,512 B1 * | 8/2001 | Fermann | 372/6 |
| 6,329,444 B1 | 12/2001 | McGlothlin et al. | |
| 6,530,670 B2 | 3/2003 | Hirayama | |
| 6,551,346 B2 * | 4/2003 | Crossley | 607/88 |
| 6,671,235 B1 * | 12/2003 | Hawryluk et al. | 369/14 |
| 7,123,796 B2 * | 10/2006 | Steckl et al. | 385/40 |
| 2005/0243243 A1 | 11/2005 | Koganezawa | |
| 2007/0086211 A1 | 4/2007 | Beeson et al. | |

FOREIGN PATENT DOCUMENTS

| | | |
|---|---|---|
| EP | 1376708 | 1/2004 |
| WO | WO 2004/053531 | 6/2004 |
| WO | WO 2006/131924 | 12/2006 |
| WO | WO 2008/146290 | 12/2008 |

OTHER PUBLICATIONS

Beeson et al. "61.5: LED-Based Light-Recycling Light Sources for Projection Displays", SID Symposium Digest of Technical Papers, 37(1): 1823-1826, Jun. 2006.
International Search Report Dated Nov. 25, 2008 From the International Searching Authority Re.: Application No. PCT/IL2008/000730.
Written Opinion Dated Nov. 25, 2008 From the International Searching Authority Re.: Application No. PCT/IL2008/000730.
International Search Report Dated Jun. 10, 2008 From the International Searching Authority Re.: Application No. PCT/IL2006/000667.
Written Opinion Dated Jun. 10, 2008 From the International Searching Authority Re.: Application No. PCT/IL2006/000667.

* cited by examiner

*Primary Examiner*—Jennifer Doan

(57) ABSTRACT

An optical coupling apparatus for coupling a waveguide to a light source, when the light source emits light at a divergence angle that is larger than the critical angle of the waveguide. The optical coupler comprises a plurality of light-guides, preferably cut from the edge of the waveguide. The light-guides are arranged to connect the waveguide to the light source via a plurality of orientations so that the entire divergence angle is covered within the critical angle of the light-guides.

7 Claims, 10 Drawing Sheets

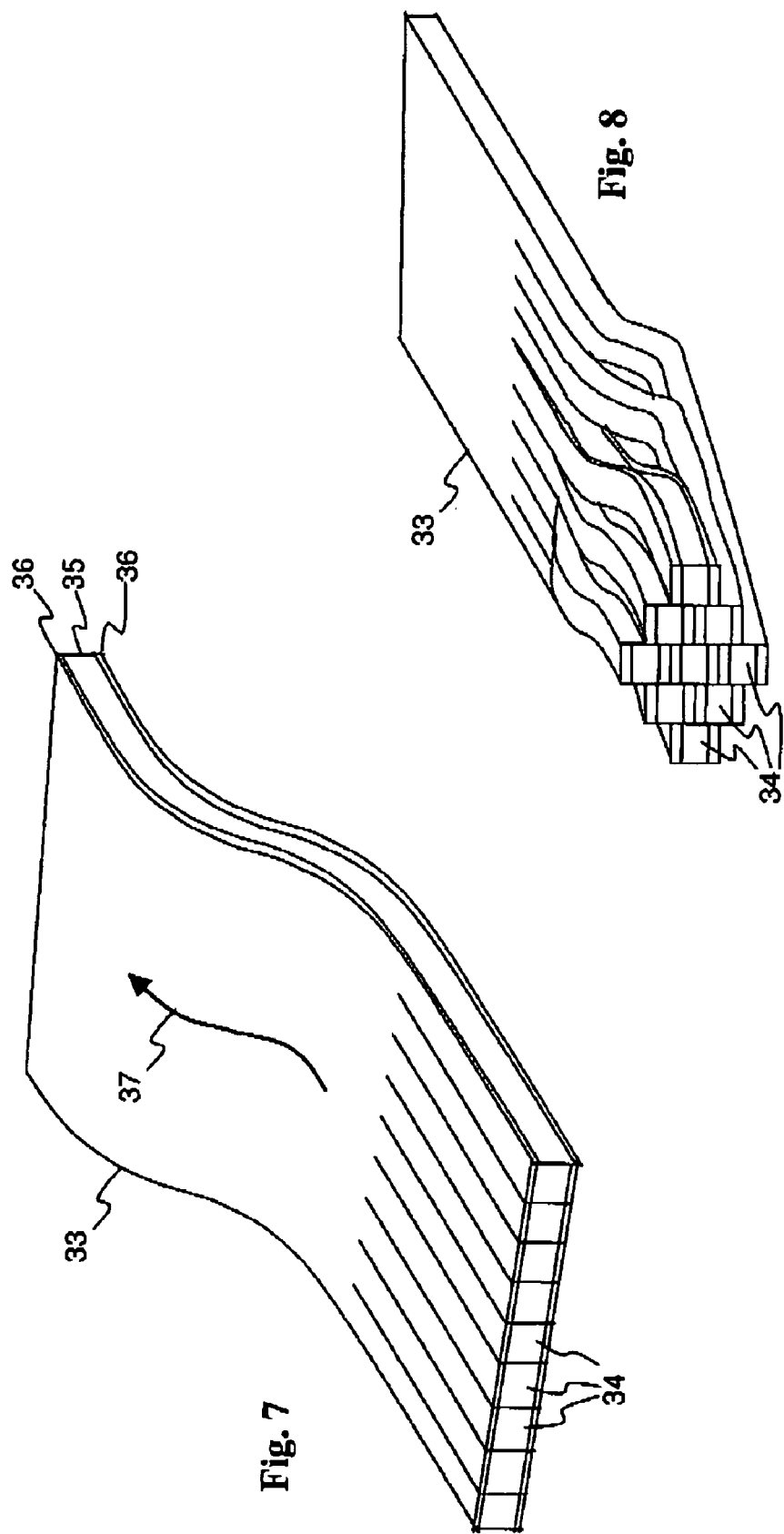

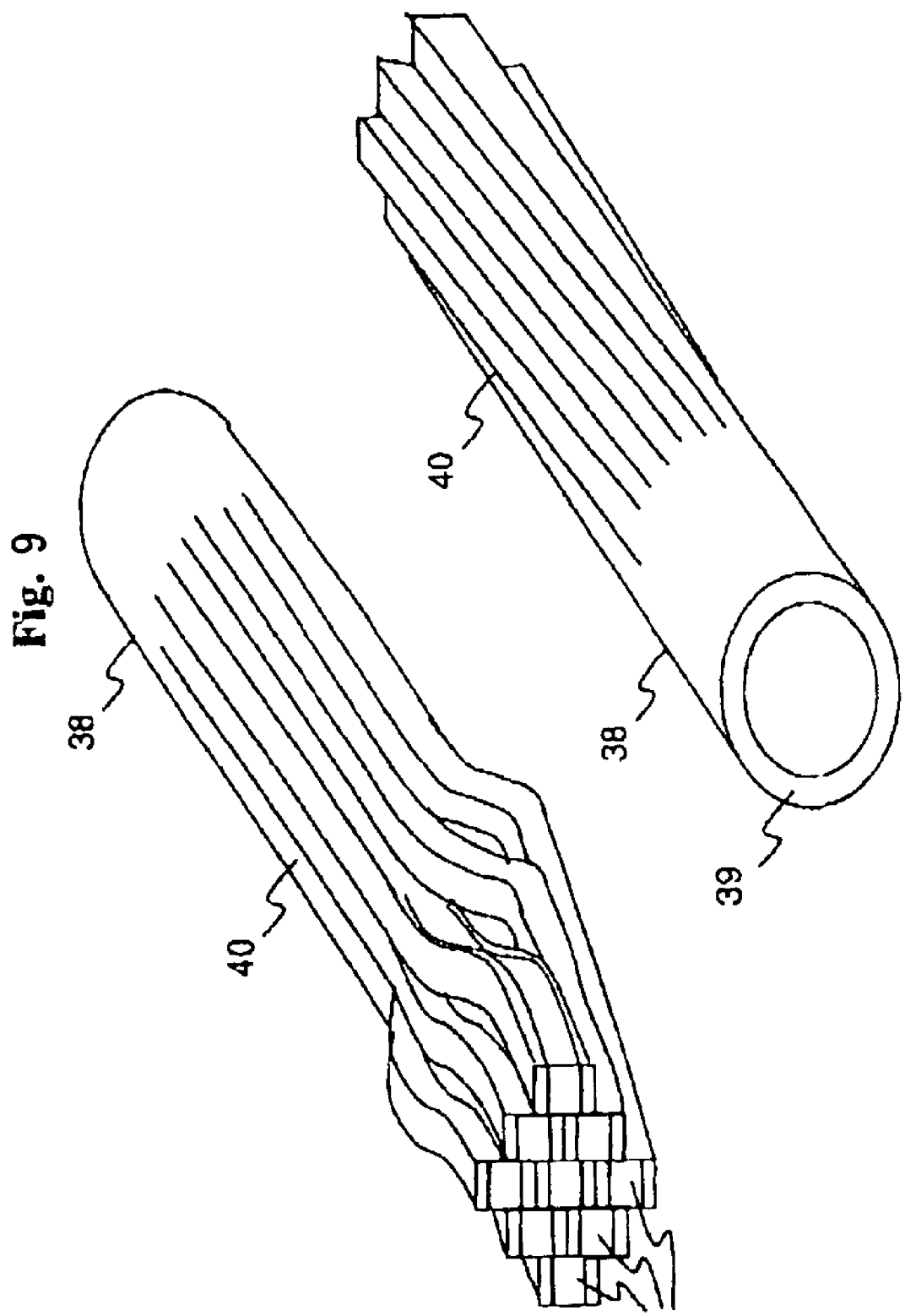

HIGH EFFICACY WAVEGUIDE COUPLER

RELATIONSHIP TO EXISTING APPLICATIONS

The present application claims priority from a U.S. provisional patent application 60/580,705 filed Jun. 21, 2004, the contents of which are hereby incorporated by reference.

FIELD AND BACKGROUND OF THE INVENTION

The present invention relates to optical couplers, and, more particularly, but not exclusively to coupling between a source of light and a waveguide.

There is a growing demand for a large variety of display devices. Sophisticated display devices serve a growing number of applications with diverse requirements. There is a continuous pressure to improve covering all the aspects of the display.

In cathode ray tubes (CRT), plasma displays, light emitting diode (LED) displays, etc. each pixel radiates light independently. Display technologies such as liquid crystal display (LCD) do not produce light within the pixel and the pixel is only able to block light. Therefore a LCD display requires illumination behind the LCD device, known as backlight. Applications of backlight include devices as small as mobile phones and as large as wide-screen LCD TV sets. The main goals of the backlight design include: high brightness, large area coverage, uniform luminance throughout the illuminated area, controlled viewing angle, either wide or narrow, small thickness, low weight, low power consumption and obviously low cost. It is therefore clear that the backlight is key to the quality of the display.

A backlight device typically comprises a lamp and a light guiding fixture, named hereinbelow a waveguide. As seen in FIG. 2, the lamp 14 produces the light energy and the waveguide 15 carries the light from the lamp to the back of the LCD device 16 and distributes the light according to the requirements. The characteristics of the waveguide affect all the required characteristics of the backlight and the display: cost, size, brightness, uniformity, power consumption, weight, etc. A higher efficiency waveguide collects more light from the light source, delivers more light to the back of the display, distributes the light more evenly, is thinner, lighter and less expensive.

Waveguide technology exploits a physical phenomenon known as total internal reflection. This phenomenon occurs at an interface between two bulks of materials, one having a refraction index higher than the other. As can be seen in FIG. 3, when a ray of light 17 travels within the material 19 of the higher refractive index and impinges on the interface 18 at an angle larger than the critical angle (also known as the angle of total reflection) the entire light is reflected back 23 into the bulk of the larger refraction index. The abovementioned angles are measured from the perpendicular to the surface of the interface.

The condition according to which the light is reflected or refracted is determined by Snell's law, which is a mathematical relation between the ratio between the impinging angle and the refracting angle (in case in case of refraction) and the ratio between the refractive indices of the two interfacing materials. Broadly speaking, depending on the wavelength of the light, for a sufficiently large impinging angle no refraction can occur and the energy of the light is trapped within the substrate. In other words, the light is reflected from the internal surface as if from a mirror. Under these conditions, total internal reflection is said to take place. The critical angle $\alpha_c$ is a function of the refraction indices $n_1$ and $n_2$ as follows:

$$\alpha_c = \sin^{-1}\left(\frac{n_1}{n_2}\right)$$

Wherein $n_2$ is the refractive index of the material in which the light ray travels and $n_1$ is the refractive index of the externally bounding material.

Therefore, for example and as seen in FIG. 4, a light pipe made of one material of relatively higher refractive index surrounded by another material of a lower refractive index, and illuminated at one side at a divergence angle smaller than required by the critical angle, carries all the light to its other end. The light follows the shape of the light pipe and emerges from the other end even if the pipe is bent, up to a certain curvature. A waveguide any assume various shapes, not necessarily like the example of the pipe. A backlight waveguide is usually flat, illuminated at its thin side and radiating from its large side, as can be seen in FIG. 2.

However, as is seen in FIG. 6, when a waveguide receives a light beam 30 that has a divergence angle 31 that is incompatible with the critical angle 22 the light that is outside the cone defined by the critical angle is refracted through the material 20 and outside the waveguide and is therefore lost.

Thus, a major aspect of the waveguide design is the interface between the lamp and the waveguide. The interface is designed to collect as much as possible of the visible energy produced by the light source. In most cases it is the waveguide that is designed to the lamp characteristics. Various lamps have various sizes, various spectral patterns, and various radiation patterns. Typical light sources are: florescent lamps, incandescent lamps, plasma lamps, light emitting diodes (LED), single fiber, fiber bundles, lasers, etc. An efficient integration of the lamp and the waveguide means that a greater portion of the visible light that the lamp produces is made available at the back of the LCD device.

To achieve efficient coupling the light emerging from the lamp must enter the waveguide within a specific divergence angle, meeting the waveguide's propagation angle. When the divergence angle complies with the propagation angle a larger portion of the light reaches the user, thus decreasing power consumption, increasing brightness, decreasing cost, and practically affecting all the parameters of the quality of the picture.

However, most of the light sources emit light over a divergence angle that is too large for all the light to be successfully coupled to the waveguide. Therefore there is a need for an additional optical system to bridge between the lamp and the waveguide. The additional optical system may typically operate by placing a larger input aperture over the light source, thus reducing the light loss due to divergence. Aside for the additional cost and size directly involved with the additional optical system, the aperture of the additional optical system is larger than the size of the light source, thus requiring a larger waveguide, increasing its weight and cost, but primarily its thickness. The coupling point between the light source and the waveguide is therefore an obstacle in making the backlight thinner and more efficient.

Another solution is the use of fiber optics bundles to provide the required coupling between the light source and the waveguide. The fibers are arranged around the light source to collect as much light within the fibers' propagation angle and are then curved and packed together to feed the light into the waveguide. Except for being expensive, this solution does not eliminate the problem because the light emerges at the end of the fibers at a divergence angle that is still too large for the waveguide.

The difference between a typical fiberoptic device and a typical backlight device should be noted. A typical fiberoptic device carries light from one end to the other. A good fiber optic device carries as much as possible light to the other end and loses as little as possible light through its sides. A typical backlight device receives light via one side, carries the light in a first direction and emits the light in a second direction. Typically the first and second directions are orthogonal. While most backlight devices are made of rigid waveguides, flexible waveguides are also known in the art, as taught by U.S. patent application WO 2004/053531A2, the contents of which are hereby incorporated by reference.

There is thus a widely recognized need for, and it would be highly advantageous to have, a waveguide coupling method and apparatus devoid of the above limitations.

SUMMARY OF THE INVENTION

According to one aspect of the present invention there is provided an optical coupling apparatus for coupling an input of a waveguide to an output of a light source. The optical coupling apparatus contains a plurality of extensions of a first end of the waveguide such that each extension is a continuation of the waveguide and the ends of the extension are placeable about the output of the light source According to another aspect of the present invention there is provided an optical waveguide wherein the extensions are of a material which is homogeneous with that of said waveguide.

According to yet another aspect of the present invention there is provided an optical coupling apparatus wherein the extension is flexible.

According to still another aspect of the present invention there is provided an optical coupling apparatus wherein the extension is elastic.

Further according to another aspect of the present invention there is provided an optical coupling apparatus wherein the waveguide propagates light along a longitudinal axis thereof and wherein the extensions are cut from the first end and along the axis.

Still further according to another aspect of the present invention there is provided an optical coupling apparatus wherein the plurality of light-guides comprises at least one of Latex, polyvinylchloride, Nitrile, Chloroprene (Neoprene), poly(cis-isoprene) 1.5191, Poly(2,3-dimethylbutadiene), Poly(dimethyl siloxane), Ethylene/vinyl acetate copolymer-40% vinyl acetate, Ethylene/vinyl acetate copolymer-30% vinyl acetate, Poly(butadiene-co-acrylonitrile), natural rubber, Poly(chloroprene).

Even further according to another aspect of the present invention there is provided an optical coupling apparatus containing a core and clading, wherein the core comprises at least one of:

Latex having an index of refraction of 1.514;
polyvinylchloride, with index of refraction of 1.539;
Nitrile, with index of refraction of about 1.52;
Chloroprene (Neoprene), with index of refraction of 1.558,
poly(cis-isoprene), with index of refraction of 1.5191;
Poly(2,3-dimethylbutadiene), with index of refraction of 1.525;
Poly(dimethyl siloxane), with index of refraction of 1.4035;
Ethylene/vinyl acetate copolymer-40% vinyl acetate, with index of refraction of 1.4760;
Ethylene/vinyl acetate copolymer-30% vinyl acetate, with index of refraction of 1.4820,
Poly(butadiene-co-acrylonitrile), with index of refraction of 1.52;
natural rubber, with index of refraction of 1.514;
Poly(chloroprene), with index of refraction of 1.558.
polyolefins,
any one of a group of polyolefins containing polyisoprene, polybutadiene, ethylene-propylene copolymers,
chlorinated olefins,
any one of a group of chlorinated olefins containing polychloroprene (neoprene) block copolymers, including diblock-, triblock-, multiblock- or star-block-,
segmented copolymers,
any one of a group of segmented copolymers containing polyurethanes, polyether-urethanes, and segmented polyether copolymers,
silicone polymers,
polyvinylchloride,
nitrile,
poly(2,3-dimethylbutadiene),
poly(dimethyl siloxane),
ethylene/vinyl acetate copolymer-40% vinyl acetate,
ethylene/vinyl acetate copolymer-30% vinyl acetate, and
poly(butadiene-co-acrylonitrile).

According to another aspect of the present invention there is provided a method of optical coupling for coupling an input of a waveguide to an output of a light source containing the steps of:

producing a waveguide operative to propagate light along a predetermined axis;

producing strips at one edge of the waveguide and along the axis of propagation of light;

bending the strips to connect to the light-source at different orientations;

wherein each of the strips is arrange to receive light within a critical angle of the strip.

According to still another aspect of the present invention there is provided a method for optical coupling wherein the strip is flexible.

According to yet another aspect of the present invention there is provided a method for optical coupling wherein the strip is elastic.

Further according to another aspect of the present invention there is provided a method of optical coupling for coupling an input of a waveguide to an output of a light source containing the steps of:

providing a waveguide operative to propagate light along a predetermined axis and having a plurality of strips at one end of the waveguide and along the axis of propagation of light;

bending the strips to connect to the light-source at different orientations;

wherein each of the strips is arrange to receive light within a critical angle of the strip.

Still further according to still another aspect of the present invention there is provided a method for optical coupling wherein the strip is flexible.

Even further according to still another aspect of the present invention there is provided a method for optical coupling wherein the strip is elastic.

Additionally according to still another aspect of the present invention there is provided a method of producing an apparatus for optical coupling of an input of a waveguide to an output of a light source containing the steps of:

producing a waveguide operative to propagate light along a predetermined axis;

producing a plurality of strips at one edge of the waveguide and along the axis of propagation of light;

wherein the strips are at least one of flexible and elastic.

According to another aspect of the present invention there is provided an optical waveguide having a first end and a second end and a longitudinal axis for propagation of light between the first end and the second end, the first end containing a plurality of extensions for flexibly fitting over a light source, thereby to provide optical coupling between the waveguide and the light source.

According to yet another aspect of the present invention there is provided an optical waveguide wherein the extensions are of a material which is homogeneous with that of the waveguide.

According to still another aspect of the present invention there is provided an optical waveguide wherein the extensions are cut into the waveguide.

Further according to another aspect of the present invention there is provided an optical waveguide wherein the extensions are parallel with the axis for propagation of light Even further according to another aspect of the present invention there is provided an optical waveguide being flexible.

Still further according to another aspect of the present invention there is provided an optical waveguide wherein the extensions are flexible.

Additionally according to another aspect of the present invention there is provided an backlight apparatus operative to emit light in a first direction, having a first end and a second end and a longitudinal axis for propagation of light between the first end and the second end, the first end containing a plurality of extensions for flexibly fitting over a light source, thereby to provide optical coupling with the light source.

According to another aspect of the present invention there is provided an optical backlight wherein the first direction being generally perpendicular to the longitudinal axis.

According to yet another aspect of the present invention there is provided an optical backlight wherein the extensions are of a material which is homogeneous with that of the backlight.

According to still another aspect of the present invention there is provided an optical backlight wherein the extensions are cut into the backlight.

Further according to another aspect of the present invention there is provided an optical backlight wherein the extensions are parallel with the axis for propagation of light.

Still further according to another aspect of the present invention there is provided an optical backlight being flexible.

Even further according to another aspect of the present invention there is provided an optical backlight wherein the extensions are flexible.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

FIG. 7 is a simplified illustration of a waveguide having flexible light-guides according to a preferred embodiment of the present invention;

FIG. 8 is a simplified illustration of another configuration of the waveguide and light-guides of FIG. 7 according to another preferred embodiment of the present invention;

FIG. 9 is a simplified illustration of another embodiment of the present invention in which a waveguide transforms a rhombus input aperture into an annular output aperture.

DESCRIPTION OF THE PREFERRED EMBODIMENTS

Figure 1:
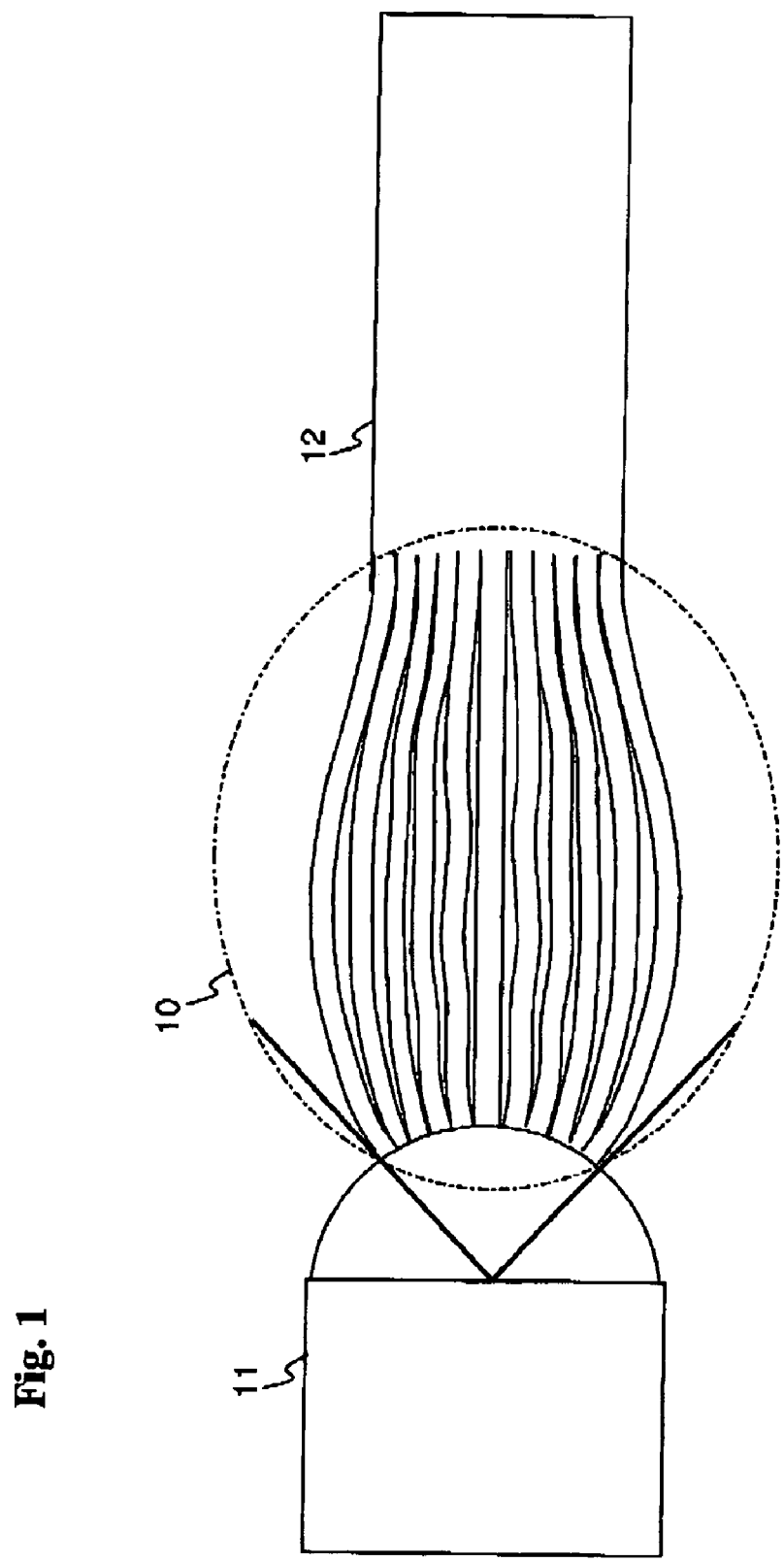
FIG. 1 is a simplified illustration of a waveguide coupling fixture according to a preferred embodiment of the present invention.

The principles, method of design, and construction, of a waveguide according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The present invention seeks to provide a method and apparatus for improved coupling between a source of light and a waveguide carrying as much as possible of the light emitted by the light source to the destination.

Waveguide technology exploits a physical phenomenon known as total internal reflection. This phenomenon occurs at an interface between two bulks of materials, one having a refraction index higher than the other. When a ray of light travels within the material of the higher refractive index and impinges on the interface at an angle larger than the critical angle (also known as the angle of total reflection) the entire light is reflected back into the bulk of the larger refraction index. (The abovementioned angles are measured from the perpendicular to the surface of the interface.)

The condition according to which the light is reflected or refracted is determined by Snell's law, which is a mathematical relation between the ratio between the impinging angle and the refracting angle (in case in case of refraction) and the ratio between the, refractive indices of the two interfacing materials. Broadly speaking, depending on the wavelength of the light, for a sufficiently large impinging angle no refraction can occur and the energy of the light is trapped within the substrate. In other words, the light is reflected from the internal surface as if from a mirror. Under these conditions, total internal reflection is said to take place. The critical angle $\alpha_c$ is a function of the refraction indices $n_1$ and $n_2$ as follows:

$$\alpha_c = \sin^{-1}\left(\frac{n_1}{n_2}\right)$$

Wherein $n_2$ is the refractive index of the material in which the light ray travels and $n_1$ is the refractive index of the externally bounding material.

As stated, total internal reflection occurs only for light rays impinging the internal surface of the waveguide with an angle, which is larger than the critical angle. Thus, a calculation performed according to geometrical optics may provide the largest angle that is allowed for total internal reflection to take place. An important parameter of every waveguide is the "numerical aperture," which is defined as the sine of the largest incident light ray angle that is successfully transmitted through the waveguide, multiplied by the index of refraction of the medium from which the light ray enters the waveguide.

Numerical-Aperture=$N \times \sin(\alpha_c)$

Reference is now made to FIG. 1, which is a simplified illustration of a waveguide coupling fixture according to a preferred embodiment of the present invention.

As shown in FIG. 1, light-guides 10 create optical coupling between a light source 11 and a waveguide 12. The light-guides 10 are arranged to connect at a first end to the light source 11 in a manner that enables the collection of as much light as possible. The light-guides 10 are arranged to connect at a second end to the waveguide 12 in a manner that enables the injection of as much light as possible to the waveguide 12.

Figure 2:
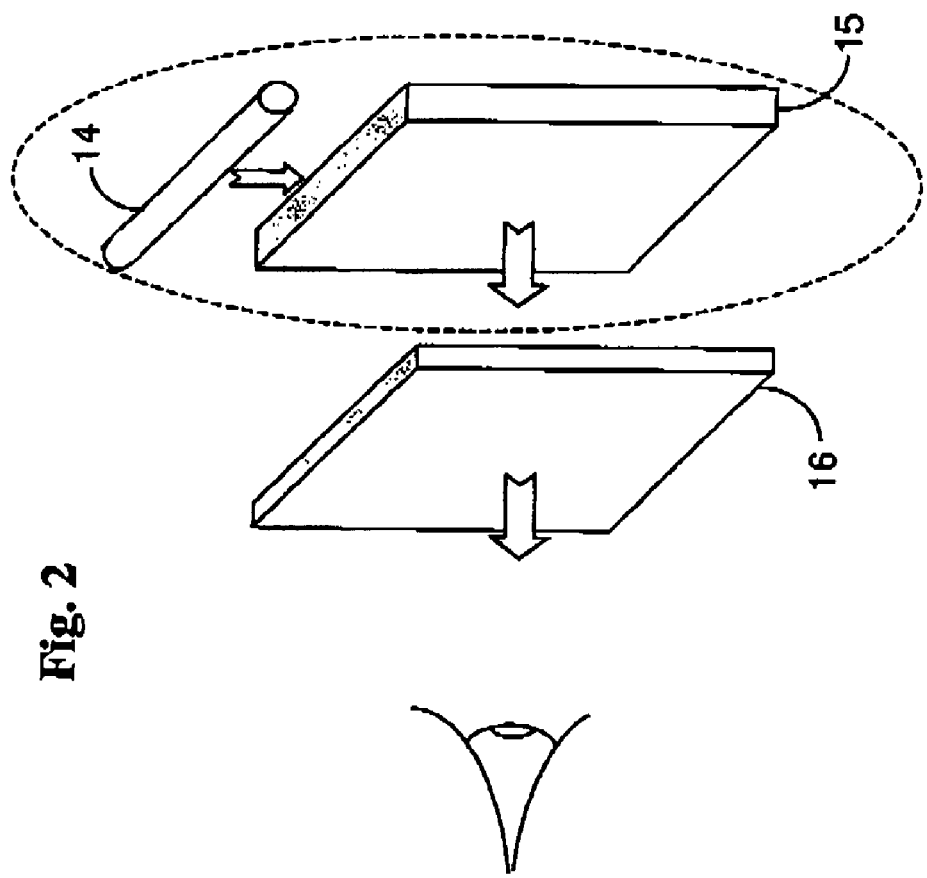
FIG. 2 is a simplified illustration of a backlight comprising a light source feeding a waveguide illuminating the back of a display according to the prior art.
Figure 3:
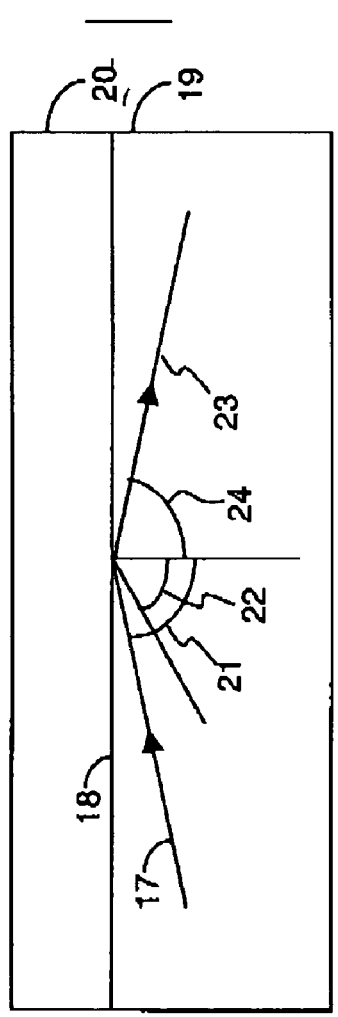
FIG. 3 is a simplified illustration of a total reflection from an interface between two materials of a different refractive index according to the prior art.

Reference is no made to FIG. 2, which is a simplified illustration of a backlight arrangement according to the prior art. A backlight 13, comprises a light source 14, here shown as a fluorescent tube, which feeds a waveguide 15, which in turn illuminates the back of a display 16, Reference is now made to FIG. 3, which is a simplified schematic illustration of total internal reflection from an interface between two materials of a different refractive index. A light ray 17 impinges on interface 18 between a bulk material 19 and bulk material 20 at an angle 21 that is larger than critical angle 22. Therefore the light ray 17 is totally internally reflected (23) into the bulk material 19 at an angle 24, that is identical to angle 21

Figure 4:
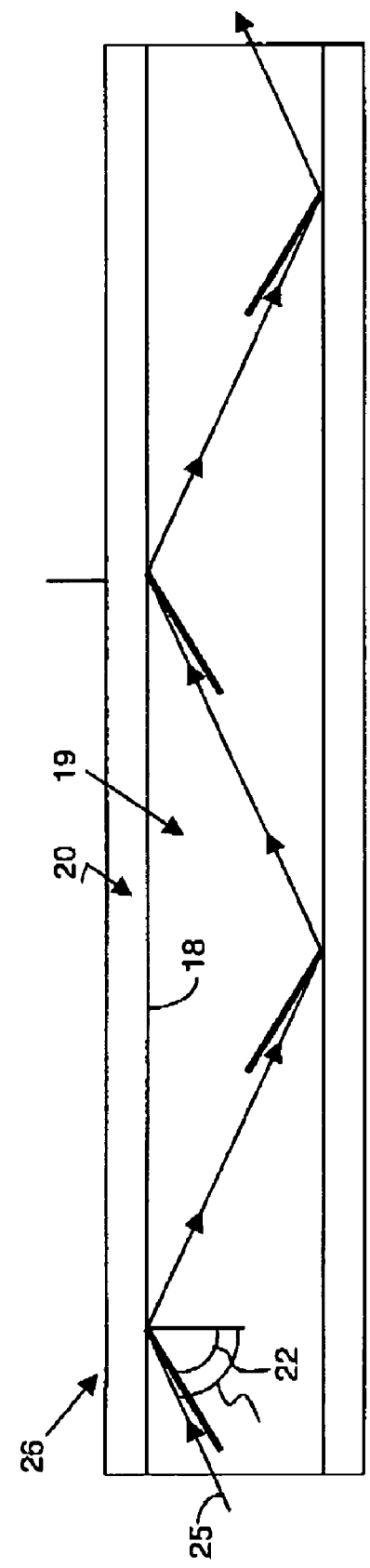
FIG. 4 is a simplified illustration of a ray of light traveling through a waveguide under the condition of total reflection and according to the prior art.

Reference is no made to FIG. 4, which is a simplified illustration of a ray of light 25 traveling through a waveguide 26 under the condition of total internal reflection and according to the prior art. The waveguide 26 comprises a core material 19 surrounded by a clading material 20, which has a lower index of refraction The ray 25 enters the waveguide 26 in an input end at an angle 27 that is larger than the critical angle 22, and is thereafter repeatedly totally internally reflected from the interface 18 between the materials until it leaves the waveguide from an output end with minimum energy loss.

Figure 5:
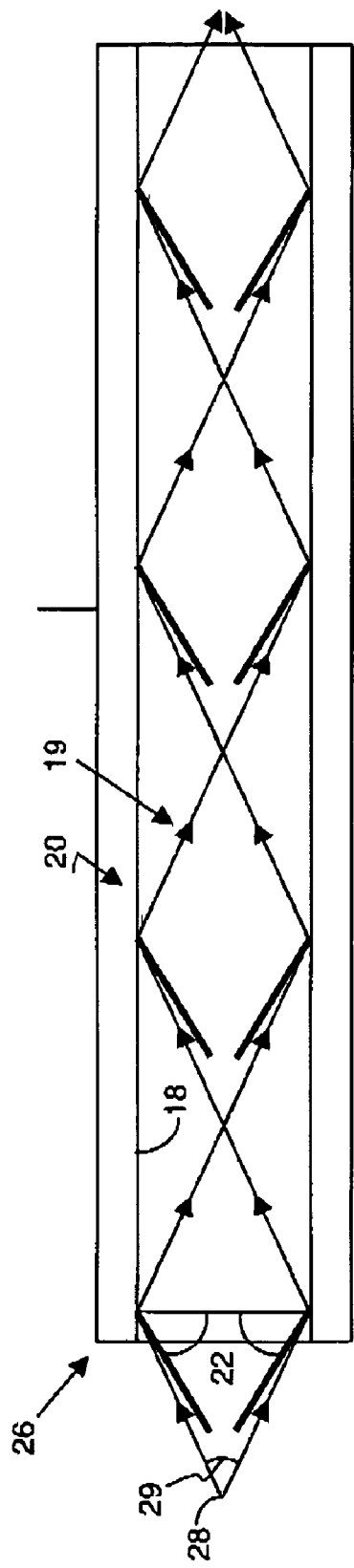
FIG. 5 is a simplified illustration of a light beam entering a waveguide at a diversion angle that complies with the critical angle of the waveguide according to the prior art.

Reference is no made to FIG. 5, which is a simplified illustration of a light beam 28 entering the waveguide 26 and according to the prior art. The light beam 28 has a diversion angle 29, which is the angle between the most extreme rays of the beam. In the example of FIG. 5 the divergence angle 29 complies with the critical angle 22. Therefore all the light rays that enter the waveguide within the divergence angle are repeatedly and totally reflected within the waveguide and eventually leave the waveguide from the output end.

Figure 6:
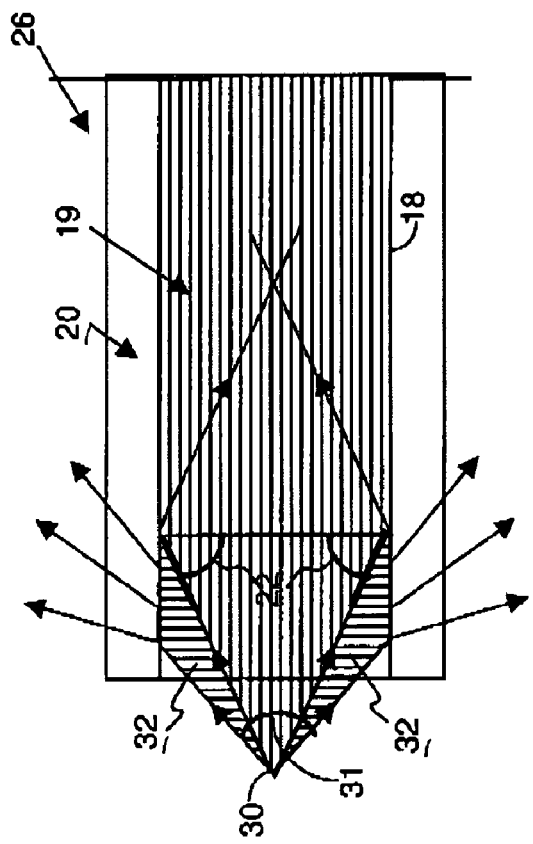
FIG. 6 is a simplified of a illustration of a light beam entering a waveguide at a diversion angle that does not comply with the critical angle of the waveguide according to the prior art.

Reference is no made to FIG. 6, which is a simplified of a illustration of a light beam 30, entering the waveguide 26 and according to the prior art. Unlike the situation described with reference to FIG. 5, the diversion angle 31 of FIG. 6 does not comply with the critical angle 22. Therefore a portion of the light rays, referenced by numeral 32 (the vertically shaded area), is refracted through the envelope of the waveguide and out of the waveguide and does not reach the output end of the waveguide.

Reference is no made to FIG. 7, which is a simplified illustration of a waveguide 33 having flexible light-guides 34, according to a preferred embodiment of the present invention. As seen in FIG. 7, the waveguide 33 comprises a core 35 having an index of refraction $n_1$ surrounded by clading layers 36 with an index of refraction $n_2$, where $n_2 < n_1$. The waveguide 33 is preferably flat, preferably flexible, and preferably elastic. The waveguide 33 is designed to propagate light in a general direction marked by 37. As seen in FIG. 7, the light-guides are produced by cutting the waveguide 33 along the direction of the propagation of the light. Thus light-guides 34 are thin, flexible and elastic at least as the waveguide 33. The light-guides can therefore be bent and shifted in six axis to form different shapes of surfaces according to the characteristics of the incoming light that has to be collected.

Reference is no made to FIG. 8, which is a simplified illustration of another configuration of the waveguide and light-guides of FIG. 7 according to a preferred embodiment of the present invention. As seen in FIG. 7, the light-guides 34 are bent and their free ends arranged to form a rhombus. It is appreciated that the free ends of the light-guides can be arranged to form any shape, whether contiguous or non-contiguous, whether flat or curved to fit the curved shape of the light bulb.

The light-guides (also known as coupling strips) provides shape transformation between the shape of the light source (LED, Single fiber, Fiber bundles, Lasers) and the shape of the waveguide entrance. This is done by dividing the light source aperture into segments and transmitting the light received from each segment into the waveguide entrance.

Using the light-guides reduces both light losses between the coupler and the waveguide by embedding the light source into the waveguide or into the strip couplers.

Examples of such shape conversion include:

a. Converting a light source circular output aperture of 8 mm diameter (fiber optic light source) into a waveguide input rectangle aperture of 1 mm×70 mm.

b. Converting a light source circular output aperture of 6 mm (fiber optic light source) into a waveguide annular input aperture of 8 mm diameter (endoscope lighting fiber bundle) as further described with reference to FIG. 9 below.

c. Converting a LED rectangular output aperture of 2 mm×0.6 mm into a flat waveguide input aperture of 0.2 mm thickness for backlight illumination.

This light coupling by aperture conversion comply with the physical brightness law that states that the angular divergence multiplied by the aperture dimension can not be reduced. Therefore reducing the aperture dimension causes an increase in the divergence angel. Thus it is impossible to increase the brightness. The light-guides of the present embodiment enable to change the aperture dimensions, for example by reducing the aperture in one direction and increasing it in the other direction, while preserving the light divergence angle. Thus providing a higher coupling efficiency.

Reference is no made to FIG. 9, which is a simplified illustration of another embodiment of the present invention in which a waveguide transforms a rectangular (rhombus) aperture of a light source into an annular aperture of an typical endoscope. FIG. 9 illustrates the waveguide from two views. As seen in FIG. 9, one end of a flexible waveguide 38 having a annular shaped output 39 is cut into strips 40 that serve as light-guides. The other ends 41 of the light guides are arranged to form a rhombus shaped input according to the shape of the output light source (not shown).

Figure 10:
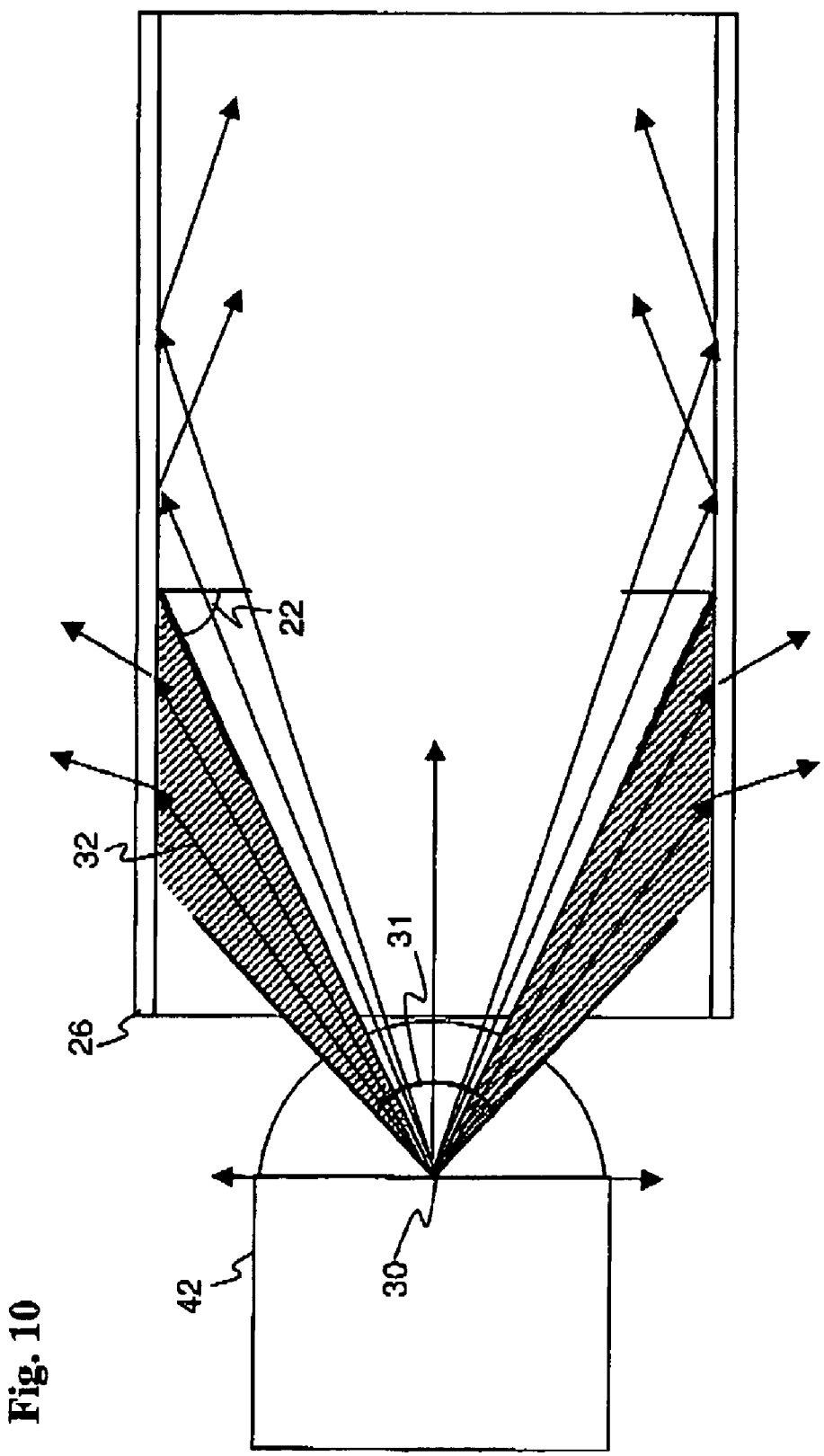
FIG. 10 is a simplified illustration of a source of light producing a light beam entering a waveguide at a diversion angle that does not comply with the critical angle of the waveguide according to the prior art.

Reference is no made to FIG. 10, which is a simplified illustration of a light source coupled with a waveguide according to the prior art, As seen in FIG. 10, a source of light 42 produces a light beam 30, that enters the waveguide 26 at a diversion angle 31 that does not comply with the critical angle 22. Therefore a portion of the light rays, referenced by numeral 32 (the shaded area), is refracted through the envelope of the waveguide and out of the waveguide and does not reach the output end of the waveguide.

Figure 11:
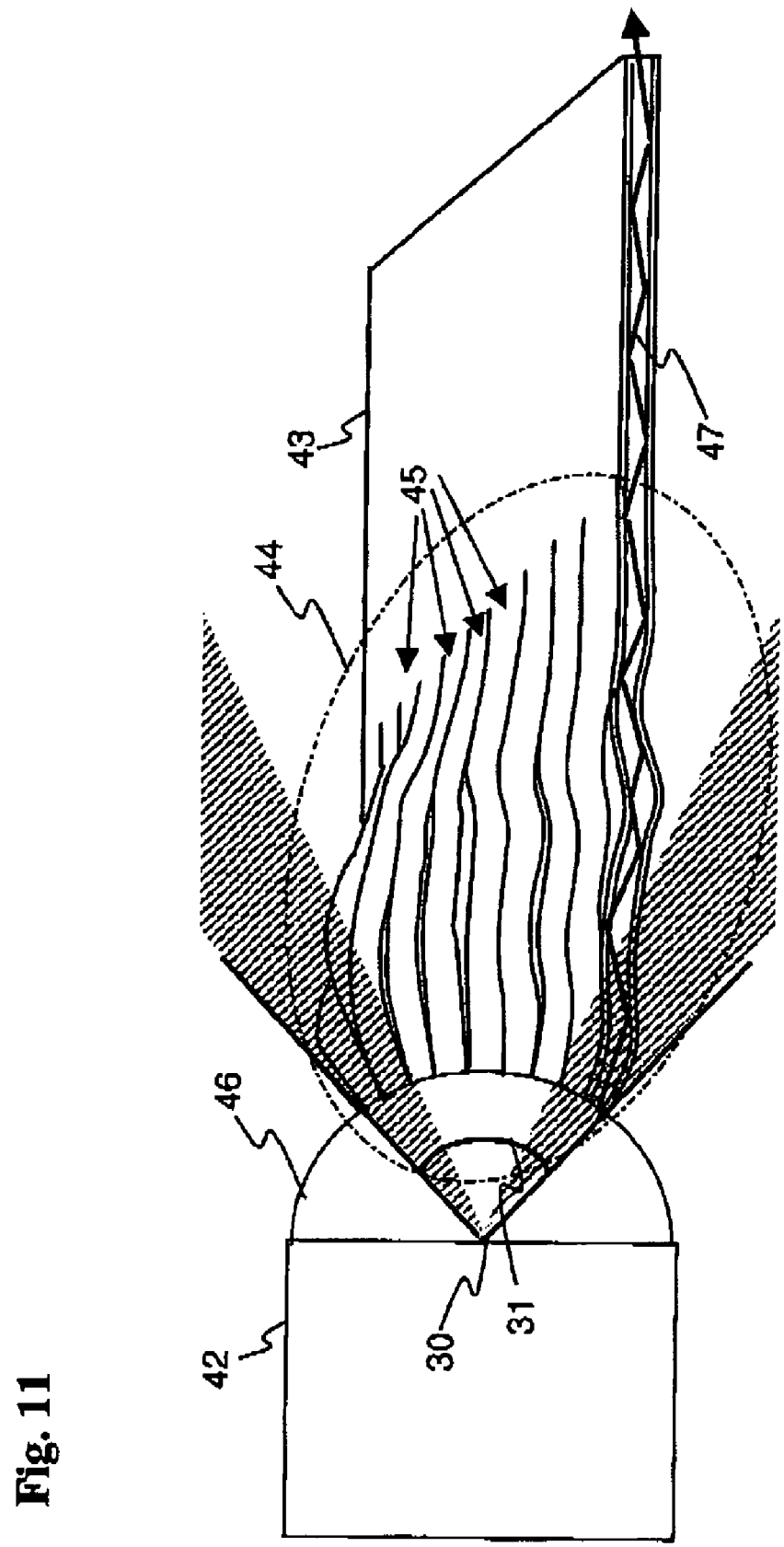
FIG. 11 is a simplified of a illustration of a preferred embodiment of the present invention wherein the same source of light of FIG. 10 is coupled to a waveguide via a coupler which comprises strips that are cut from the edge of waveguide.

Reference is now made to FIG. 11, which is a simplified illustration of a preferred embodiment of the present invention. As seen in FIG. 11, the same source of light 42 of FIG. 10 having the same diversion angle 31 is coupled to waveguide 43 via a coupler 44, which comprises strips 45 that are cut from the edge of waveguide 43. The strips 45 are arranged around the surface 46 of the source of light in adequate orientations so that each strip receives light at an angle of divergence that is compatible with the critical angle of the waveguide. Thus, even the portions of the radiated light that was lost in the embodiment of the prior art described with reference to FIG. 10 (marked as shaded area) are here propagated along the waveguide, as shown by a exemplary light ray 47.

Figure 12:
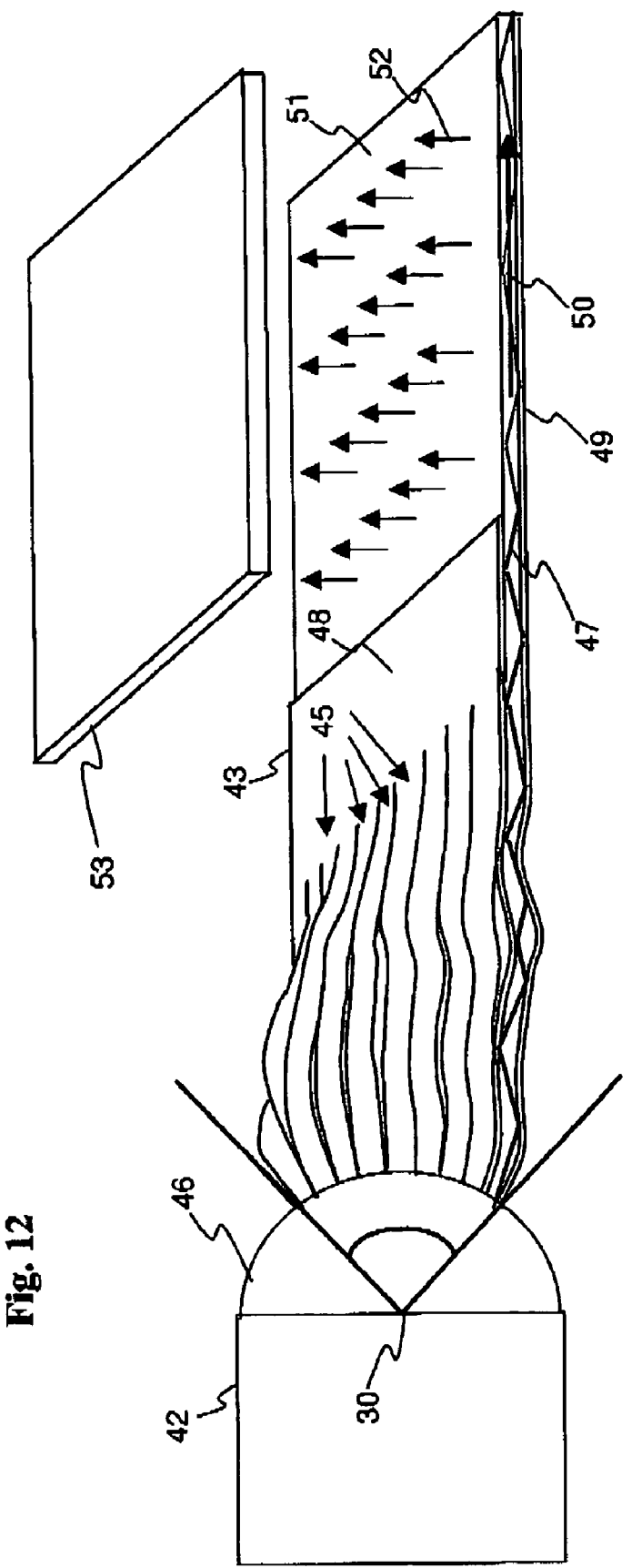
FIG. 12 is a simplified illustration of a backlight device according to a preferred embodiment of the present invention.

Reference is now made to FIG. 12, which is a simplified illustration of a backlight device according to a preferred embodiment of the present invention. As seen in FIG. 12, the source of light 42 is coupled to the waveguide 43 via a coupler comprising strips 45 that are cut from the edge of the waveguide 43 in the same manner described with reference to FIG. 11, The first part of the waveguide 43, marked by reference number 48, propagates the light to the second part of the waveguide, marked by reference number 49, which provides the backlight function. The backlight section 49 continue to carry the light in the longitudinal direction marked by reference number 50, while at the same time emitting light via surface 51, in the direction 52, and typically towards and through the back side of the LCD 53.

Representative examples for polymers which may be used for the core layer include, without limitations, Latex, with index of refraction of 1.514; polyvinylchloride, with index of refraction of 1.539; Nitrile, with index of refraction of about 1.52; and Chloroprene (Neoprene), with index of refraction of 1.558. Other materials which may be used include, without limitation, poly(cis-isoprene), with index of refraction of 1.5191; Poly(2,3-dimethylbutadiene), with index of refraction of 1.525; Poly(dimethyl siloxane), with index of refraction of 1.4035; Ethylene/vinyl acetate copolymer-40% vinyl acetate, with index of refraction of 1.4760; Ethylene/vinyl acetate copolymer-30% vinyl acetate, with index of refraction of 1.4820, Poly(butadiene-co-acrylonitrile), with index of refraction of 1.52; natural rubber, with index of refraction of 1.514; and Poly(chloroprene), with index of refraction of 1.558. In addition, a high refractive index may also be achieved, in accordance with an optional preferred embodiment of the present invention, by using additives (e.g., colloidal silica).

The polymeric material may optionally comprise natural rubber, a synthetic rubber or a combination thereof. For example, latex may optionally be used. Examples of synthetic rubbers, particularly those which are suitable for medical articles and devices, are taught in U.S. Pat. No. 6,329,444, hereby incorporated by reference as if fully set forth herein with regard to such illustrative, non-limiting examples. In a preferred embodiment of the present invention the synthetic rubber is prepared from cis-1,4-polyisoprene. It appreciated that other synthetic rubbers can be used. Natural rubber is typically produced from *Hevea brasiliensis*, however, it is appreciated that other species may be suitable for the purpose.

Other materials that can be used alone or in combination with each other, or with one or more of the above rubber materials, include but are not limited to, crosslinked polymers such as: polyolefins, including but not limited to, polyisoprene, polybutadiene, ethylene-propylene copolymers, chlorinated olefins such as polychloroprene (neoprene) block copolymers, including diblock-, triblock-, multiblock- or star-block-, such as: styrene-butadiene-styrene copolymers, or styrene-isoprene-styrene copolymers (preferably with styrene content from about 1% to about 37%), segmented copolymers such as polyurethanes, polyether-urethanes, segmented polyether copolymers, silicone polymers, including copolymers, and fluorinated polymers and copolymers. Other exemplary materials include but are not limited to, polyvinylchloride, nitrile, poly(2,3-dimethylbutadiene), poly(dimethyl siloxane), ethylene/vinyl acetate copolymer-40% vinyl acetate, ethylene/vinyl acetate copolymer-30% vinyl acetate, poly(butadiene-co-acrylonitrile), optionally with one or more additives (e.g., colloidal silica).

EXAMPLE

A backlight for a display having a of 2.1 inch, a length of 42.672 mm of and a width of 32.004 mm is connected to a light source such as a LED that has a divergence angle of 25 degrees. The waveguide is coupled to the light source via 15 light-guides attached to the waveguide's core ($n_2$) layer.

The waveguide's clading material had refractive index of $n_1=1.48$.

The waveguide's core layer and strips has refractive index of $n_2=1.51$.

The waveguide's propagation angle is 11.44 degrees and the numerical aperture is 0.1983.

A lens is mounted between the LED and the light-guides (strips).

The coupling efficiency, that is the percentage of the light received by the waveguide at the output of the coupler, from the light emitted from the LED at the output to the coupler, is 70.98%.

The following table presents the calculations of the system from a standard energy source via the input into the strips, strips transmission losses, waveguide transmission and total light exiting at the emitting point.

| Total Intensity Transmission | | 71% | |
|---|---|---|---|
| Light Source Features | | | |
| Divergence of the light source | Deg | 25 | |
| Diameter of the light source | Mm | 0.3 | |
| Output of the light source | | 1 | |
| Source Transmission | | 1 | |
| Intensity | | 1 | |
| Collimator loss calculations | | | |
| Aperture angle | | 4.663077 | f × tan (Source div) × 2 |
| Divergence | deg. | 10 | |
| Focal length | mm | 5 | |
| F# | | 1.072253 | f/D -> f/aperture |
| Lens Transmission | | 0.97 | |
| Collimator Transmission (from the original source) | | 0.97 | |
| Intensity (from the original source) | | 0.97 | |
| Entrance loss calculations (point where lights source is meeting $n_2$ layer) | | | |
| $n_1$ refractive index | | 1.48 | |
| $n_2$ refractive index | | 1.51 | |
| Propagation angle (everything within this angle is propagated inside the waveguide) | deg | 11.44014 | $90 - \alpha_c$: $\alpha_c = \text{asin}(n_1/n_2)$ |
| Numerical Aperture | | 0.198344 | $\sin(\alpha_c)$ |
| Free space between the coupler and the waveguide | mm | 0.01 | |
| Aperture | mm | 4.666603 | Collimator Aperture + 2 × free space × tan (collimator divergence) |
| Input | mm² | 17.10376 | |
| Transmission (input losses are 0.3%) | | 0.97 | |
| Entrance Transmission | | 0.97 | |
| Intensity (from the original light source) | | 0.9409 | |

-continued

Figure 13:
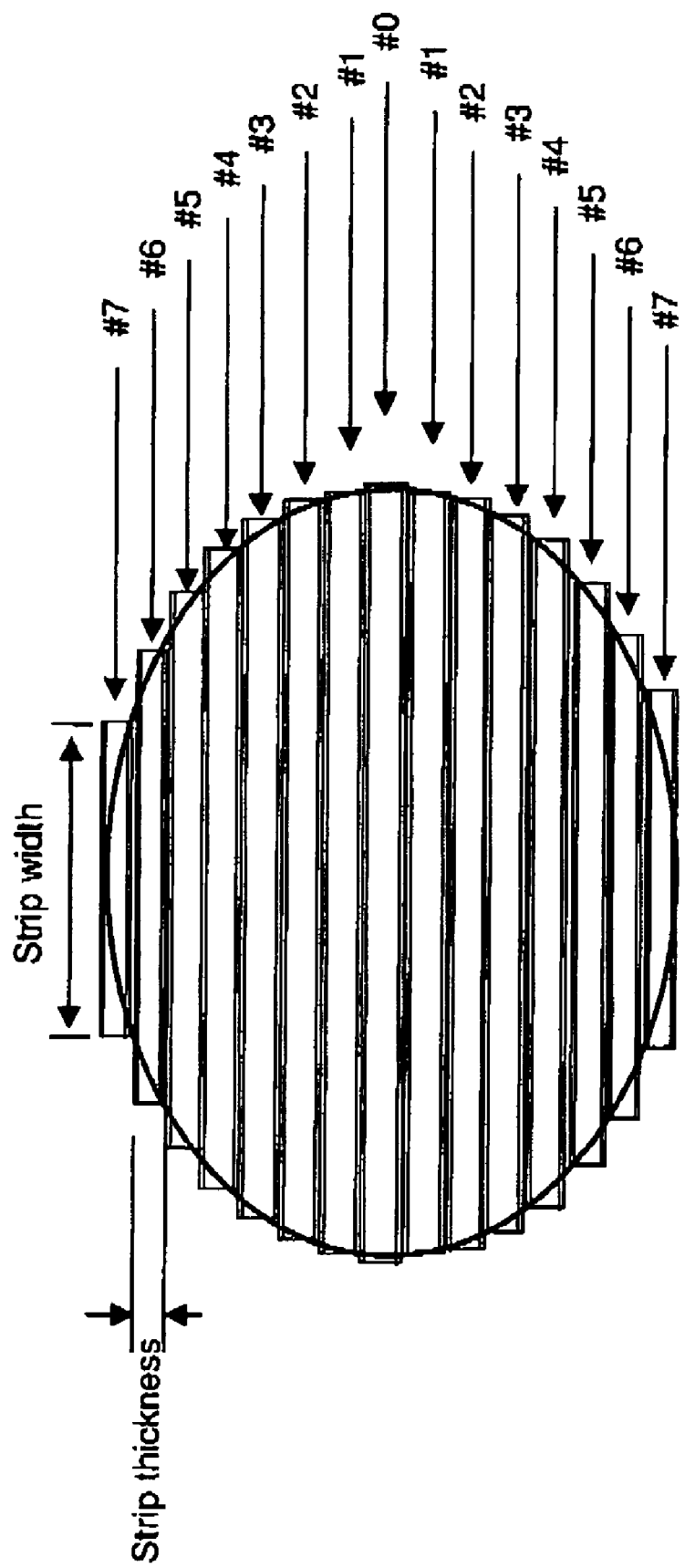
FIG. 13 is a simplified illustration of the arrangement of light guides (strips) in another preferred embodiment of the present invention.

| Total Intensity Transmission | | 71% | |
|---|---|---|---|
| Strips loss calculations | | | |
| Number of strips | | 14 | |
| Strip core thickness | mm | 0.3 | $n_2$ thickness |
| Strip cladding thickness | mm | 0.01 | $n_1$ thickness |
| Total strip thickness | mm | 0.31 | Waveguide's thickness |
| Central strip #0 width (b0) | mm | 4.9 | See FIG. 13 |
| Strips #1 width | mm | 4.8 | $\sqrt{\{(b0/2)^2 - [(n + 0.5) \times \text{thickness}]^2\}} \times 2$ |
| Strips #2 width | mm | 4.6 | |
| Strips #3 width | mm | 4.4 | |
| Strips #4 width | mm | 4 | |
| Strips #5 width | mm | 3.5 | |
| Strips #6 width | mm | 2.8 | |
| Strips #7 width | mm | 1.5 | |
| Entrance width | mm | 56.1 | |
| Effective entrance | mm² | 16.83 | |
| Fill factor | | 0.983994 | |
| Max light-guide length | mm | 15 | |
| Internal loss | dB/cm | 0.04 | |
| Transmission efficiency due to internal loss | | 0.986279 | $10^{[(db \times length)/10]}$ |
| Strips twist loss | | 5% | |
| Strips deformation loss | | 5% | |
| Total strip transmission | | 0.87587 | |
| Grand total transmission intensity | | 0.824106 | |
| Waveguide loss calculations | | | |
| Diagonal | Inch | 2.1 | |
| | mm | 53.34 | |
| Length | mm | 42.672 | |
| Width | mm | 32.004 | |
| Effective screen | mm² | 1365.675 | |
| Screen width | mm | 56.1 | |
| Stripe extra length | mm | 5 | |
| Screen length | mm | 47.672 | |
| Screen surface | mm² | 2674.399 | |
| Efficacy factor | | 90% | |
| Transmission due to internal losses | | 0.957042 | $10^{[(db \times length)/10]}$ |
| Screen transmission | | 0.861338 | |
| Total efficiency | | 0.709834 | |

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An optical waveguide apparatus comprising:
   a waveguide having a core layer between two cladding layers; and
   a plurality of extensions of a first end of said waveguide, said extensions being such that each extension is a continuation of said waveguide and of a material which is homogeneous with that of said waveguide, wherein an end of said extension is placeable about an output of a light source, such that light from said output is coupled into said waveguide through said extensions, propagates in part of said waveguide, and exits said waveguide through at least one of said cladding layers.

2. An optical coupling apparatus according to claim 1, wherein said extension is flexible.

3. An optical coupling apparatus according to claim 1, wherein said extension is elastic.

4. An optical coupling apparatus according to claim 1, wherein said waveguide propagates light along a longitudinal axis thereof and wherein said extensions are cut from said first end and along said axis.

5. An optical coupling apparatus according to claim 1, wherein said plurality of light-guides comprises at least one of Latex, polyvinylchloride, Nitrile, Chloroprene (Neoprene), poly(cis-isoprene) 1.5191, Poly(2,3-dimethylbutadiene), Poly(dimethyl siloxane), Ethylene/vinyl acetate copolymer-40% vinyl acetate, Ethylene/vinyl acetate copolymer-30% vinyl acetate, Poly(butadiene-co-acrylonitrile), natural rubber, Poly(chloroprene).

6. An optical coupling apparatus according to claim 1, and comprising a core and clading, wherein said core comprises at least one of:
   Latex having an index of refraction of 1.514;
   polyvinylchloride, with index of refraction of 1.539;
   Nitrile, with index of refraction of about 1.52;
   Chloroprene (Neoprene), with index of refraction of 1.558;
   poly(cis-isoprene), with index of refraction of 1.5191;
   Poly(2,3-dimethylbutadiene), with index of refraction of 1.525;
   Poly(dimethyl siloxane), with index of refraction of 1.4035;
   Ethylene/vinyl acetate copolymer-40% vinyl acetate, with index of refraction of 1.4760;
   Ethylene/vinyl acetate copolymer-30% vinyl acetate, with index of refraction of 1.4820,
   Poly(butadiene-co-acrylonitrile), with index of refraction of 1.52;
   natural rubber, with index of refraction of 1.514;
   Poly(chloroprene), with index of refraction of 1.558;
   polyolefins,
   any one of a group of polyolefins comprising polyisoprene, polybutadiene, ethylene-propylene copolymers,
   chlorinated olefins,
   any one of a group of chlorinated olefins comprising polychloroprene (neoprene) block copolymers, including diblock-, triblock-, multiblock- or star-block-, segmented copolymers,
   any one of a group of segmented copolymers comprising polyurethanes, polyether-urethanes, and segmented polyether copolymers,
   silicone polymers,
   polyvinylchloride,
   nitrile,
   poly(2,3-dimethylbutadiene),
   poly(dimethyl siloxane),
   ethylene/vinyl acetate copolymer-40% vinyl acetate,
   ethylene/vinyl acetate copolymer-30% vinyl acetate, and
   poly(butadiene-co-acrylonitrile).

7. An optical coupling apparatus for coupling an input of a waveguide to an output of a light source, the apparatus comprising:
   a plurality of elastic extensions of a first end of said waveguide, said extensions being such that each extension is a continuation of said waveguide and of a material which is homogeneous with that of said waveguide, wherein an end of said extension is placeable about said output;
   wherein at least some of said elastic extensions are of the same length before said placement about said output but are being stretched to different lengths after said placement about said output.

* * * * *